United States Patent
Maisotsenko et al.

(10) Patent No.: US 6,776,001 B2
(45) Date of Patent: Aug. 17, 2004

(54) METHOD AND APPARATUS FOR DEW POINT EVAPORATIVE PRODUCT COOLING

(75) Inventors: Valeriy Maisotsenko, Aurora, CO (US); Leland E. Gillan, Denver, CO (US); Timothy L. Heaton, Arvada, CO (US); Alan D. Gillan, Denver, CO (US)

(73) Assignee: Idalex Technologies, Inc., Arvada, CO (US)

( * ) Notice: Subject to any disclaimer, the term of this patent is extended or adjusted under 35 U.S.C. 154(b) by 0 days.

(21) Appl. No.: 10/203,195

(22) PCT Filed: Feb. 7, 2001

(86) PCT No.: PCT/US01/04081
§ 371 (c)(1),
(2), (4) Date: Oct. 28, 2002

(87) PCT Pub. No.: WO01/57459
PCT Pub. Date: Aug. 9, 2001

(65) Prior Publication Data
US 2003/0126876 A1 Jul. 10, 2003

Related U.S. Application Data

(60) Provisional application No. 60/265,548, filed on Jan. 31, 2001, and provisional application No. 60/180,819, filed on Feb. 7, 2000.

(51) Int. Cl.[7] .......................... F28C 1/00; F25D 17/06; F02M 23/14
(52) U.S. Cl. ............... 62/315; 62/91; 261/153
(58) Field of Search .................. 62/315, 314, 304, 62/310, 121, 171, 91; 261/153, 154

(56) References Cited

U.S. PATENT DOCUMENTS

| | | |
|---|---|---|
| 3,683,591 A | 8/1972 | Glav |
| 4,002,040 A | 1/1977 | Munters et al. |
| 4,544,513 A | 10/1985 | Otterbein |
| 4,758,385 A | 7/1988 | Acker et al. |
| 4,933,117 A | 6/1990 | Wilson |
| 5,187,946 A | 2/1993 | Rotenberg et al. ............ 62/314 |
| 5,212,956 A | 5/1993 | Tsimerman ..................... 62/94 |
| 5,349,829 A | 9/1994 | Tsimerman ................... 62/314 |
| 5,453,223 A | 9/1995 | Maisotsenko |
| 5,664,433 A | 9/1997 | Bourne ......................... 62/314 |
| 5,727,394 A | 3/1998 | Belding ......................... 62/94 |
| 5,860,284 A | 1/1999 | Goland et al. .................. 62/94 |
| 6,018,953 A | 2/2000 | Belding ......................... 62/94 |
| 6,282,915 B1 | 9/2001 | Egbert ......................... 62/314 |

Primary Examiner—Chen Wen Jiang
(74) Attorney, Agent, or Firm—Jennifer L. Bales; Macheledt Bales & Heidmiller LLP

(57) ABSTRACT

The present invention relates to a method and an apparatus for providing enhanced indirect evaporative cooling of air, water, fuel, or other fluids while controlling the humidity. The design makes cooling down to the dew point possible without energy input other than the energy to produce the fluid flow needed. The design makes use of stacked composite plates (7) with channels (1, 2) for fluid flow between adjacent plates. On opposing surface areas of these plates, there are wet areas (4) or dry areas (3). The wet areas (4) provide cooling by conventional evaporation which is in turn used to cool the fluids in contact with the dry areas (3). The benefit is controlled heat transfer, which allows selected cooling of fluid flow such that the temperature as low as dew point are reachable.

26 Claims, 10 Drawing Sheets

METHOD AND APPARATUS FOR DEW POINT EVAPORATIVE PRODUCT COOLING

RELATED APPLICATIONS

This application is a U.S. national filing under 35 U.S.C. 371 and claims the benefit of PCT International Patent Application Serial No. PCT/US01/04081 filed Feb. 7, 2001, which was published under PCT Article 21(2) in English and which claims priority to U.S. Provisional Patent Application Serial No. 60/265,548 filed Jan. 31, 2001 and to U.S. Provisional Patent Application Serial No. 60/180,819 filed Feb. 7, 2000, both now abandoned.

FIELD ON THE ART

The present invention relates to methods and apparatus for indirectly cooling a fluid by evaporation and more specifically to a method and an apparatus for cooling air, or a product other than air, to substantially the dew point temperature of the air used in the evaporative cooling.

BACKGROUND OF THE INVENTION

Indirect evaporative cooling has been used for many years to cool high temperature fluids down to near the wet bulb temperatures for commercial and industrial processes such as refrigeration systems. The use of indirect evaporative cooling for direct air conditioning systems has been commercially available but never commercially viable as proven by the lack of available products on the market at costs that reflects their effectiveness.

The commercially available indirect evaporative cooling systems use a two-step process for cooling, indirect evaporative cooling of the air to less than half of the difference between the wet bulb temperature and then adiabatic cooling to the final temperature. With this process the temperature is reduced to less than the wet bulb temperature however the humidity is increased significantly. The high humidity limits their use to some residential and industrial applications where temperature not humidity is a concern.

There are two major problems with evaporative coolers that are to be used for supply of air directly for air conditioning: 1) associated high humidity, and 2) high cost of manufacturing.

There are several prior art indirect evaporative coolers that have a more thermodynamic efficient indirect evaporative cooling process than older versions. The prior art has not made it to manufacturing most likely due to their lack of understanding of materials needed to realize the efficiency of the process, the physical design of the apparatus that require at least two separate pieces of equipment and the resultant high cost to manufacture the designs.

This patent describes a method and apparatus for Dew Point Indirect Evaporative Cooling that utilizes a highly efficient thermodynamic process of heat and mass exchange between air and water, or other volatile fluid, is inexpensive to manufacture, providing temperatures that approach the dew point temperature of the entering fluid as opposed to the wet bulb temperature, and with little or no moisture added to the air.

DESCRIPTION OF PRIOR ART

Analogy: U.S. Pat. No. 4,002,040 (dated January 1977). Incorporates indirect evaporative cooling over a number of plates and several airflow designs that includes using some of the precooled dry air as evaporative air. This design requires a higher-pressure drop due to the need of the air to enter, pass through, exit an indirect evaporative cooler, then turn around 180 degrees and reenter the indirect evaporative cooler. The wetting system was proposed to be intermittent to help prevent over wetting, but this is difficult in practice as the drying is dependent on entering air humidity and flow rate. In addition the apparatus will not operate efficiently when either over wetted or partially dried out. The materials to build the apparatus were not discussed, but these affect not only the efficiency but also the manufacturability at a cost that could be desirable to consumers.

Russian Patent No. 2,037,104 (dated Jul. 7, 1991); U.S. Pat. No. 5,453,223 (filed Sep. 12, 1994), [though applicant does not admit the validity of the U.S. patent, as it was filed more than one year after the disclosure was public knowledge]. Disclosed using a square plate design with cross flow between the plate heat exchange surfaces. The plates were designed to have wet and dry zones with the opposing sides of the plate being dry and wet respectively. The wet and dry zones were created along the diagonal of the square plate where the air entered along a dry surface and proceeded to a wet surface where it departed. Because the plates had wet zones with opposing dry zones, the air passing in cross flow over them would be indirectly cooled. The design provided for pre-cooling of the air before entering an evaporative section and then the flow was split providing either waste heat exhaust air or cooling air to the user.

This prior art designs have the following disadvantages:

The existing method and design always increases the absolute humidity of air used.

In some applications higher humidity is not wanted.

The inefficiency of the working air's lower exhaust temperatures indicating the loss of cooling capacity.

The unit's inability to cool a product other than air.

The inability to separate the air streams entering the cooler for more efficient operation. Hot dry air coming out of a dehumidification process, separating from recirculating inside air.

The unit lacked flow direction in channels causing air mixing and therefore temperature mixing preventing the greatest possible temperature differences across a plate. This prevents the lowest possible outlet temperatures. The lack of flow direction also causes uneven or stagnated flow diminishes the effectiveness of the surface area of the plates.

Inefficient direct evaporative section of cooling air, caused by having an impervious surface on one side of the plate.

The concepts were never put into practical application most likely due to their complex design and expensive fabrication requirements.

The plates did not have a common wick material making it difficult to wet the plates.

The design did not allow for non horizontal wetting of panels or using natural capillary transporting of water to wet moist surface.

The design requires higher-pressure drops and thus impaired efficient surface area use.

The proposed method and apparatus for this invention eliminates these disadvantages.

SUMMARY OF THE INVENTION

The purpose of the method and apparatus for dew point indirect evaporative cooling is to provide the product fluid for example air, water, oil, etc., which is cooled by passing multiple product streams through the invention apparatus to a user. The apparatus uses multiple working air streams that are first precooled and then passed in cross flow, or counter flow, over an indirect evaporative cooling plate The working air streams, by evaporation, take heat from the heat exchange plate, which provides the interface between the working air and the product stream fluid, which in turn takes heat from the product fluid.

A further object is to obtain lower temperatures when air is used as the product fluid, by using an adiabatic evaporative section added after the indirect cooling dry section, creating an efficient direct evaporative process within the same apparatus.

Due to the thermodynamic cycle in the working air, a further refinement of the apparatus, air can be heated before entering the apparatus in some humid climate conditions to provide added cooling capacity by providing greater latent heat capacity. This may be done by direct heat input or by removing humidity from the entering air Another object of this invention is to allow the humid working air exhaust to be used as the product and directed to the user for humidification of desired area, for example, in the winter, in residential areas.

The method and apparatus can be used in conjunction with existing desiccant dehumidification systems to cool building fresh makeup air taking advantage of relatively dry and cool building air making a very efficient process. It can also be used to cool dehumidified building recirculation air.

The plates in the apparatus are made of a layer of wick material with a thin waterproof or low permeability coating in dry zones. Channel guides or corrugated sheets can be used to hold the plates apart and give direction to the working air and product fluids.

The plate wick is wetted by wicking, or by natural capillary transportation of water out of a reservoir.

DETAILED DESCRIPTION OF THE INVENTION

The following embodiment as exemplified by the drawings is illustrative of the invention and is not intended to limit the invention as encompassed by the claims of the application. Method and apparatus for cooling a product fluid by using ambient air or dehumidified air in an indirect evaporative process that approaches the dew point temperature of the entering working airs absolute humidity. In addition the apparatus can be used to more effectively humidify the air in dry climates than existing humidifiers on the market. As will be appreciated by those persons skilled in the art, several major advantages are provided by the present invention for cooling a product by utilizing a simple, efficient method and apparatus, which has a high efficiency, uses a minimum of energy, consumes a minimum of space and is economical to fabricate.

Figure 1A:
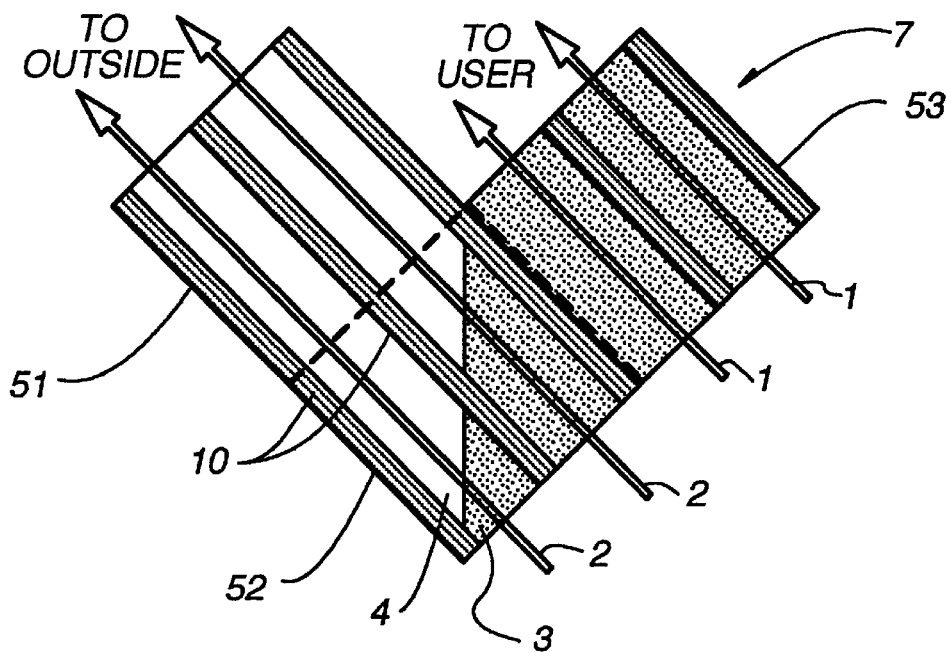
FIG. 1A is a schematic representation of the flow path of the present invention for the first side of plate.
Figure 1B:
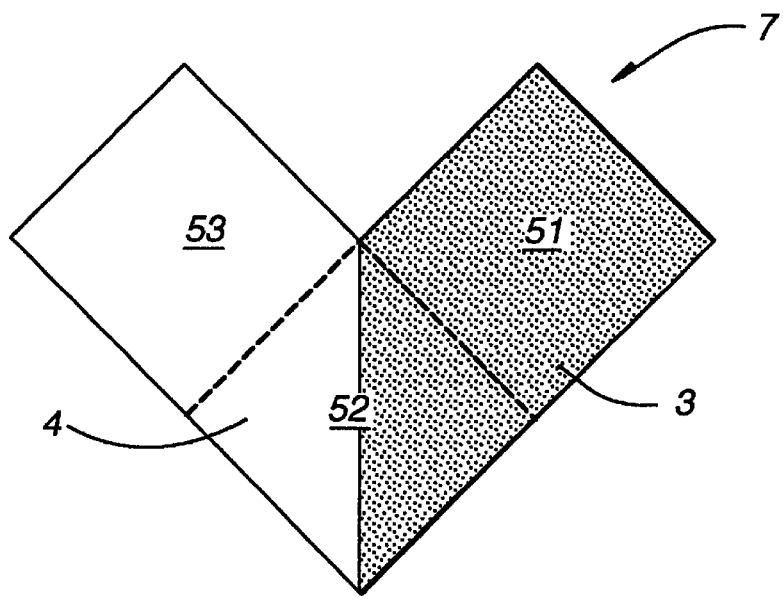
FIG. 1B is the reverse side of the plate in FIG. 1A.
Figure 2A:
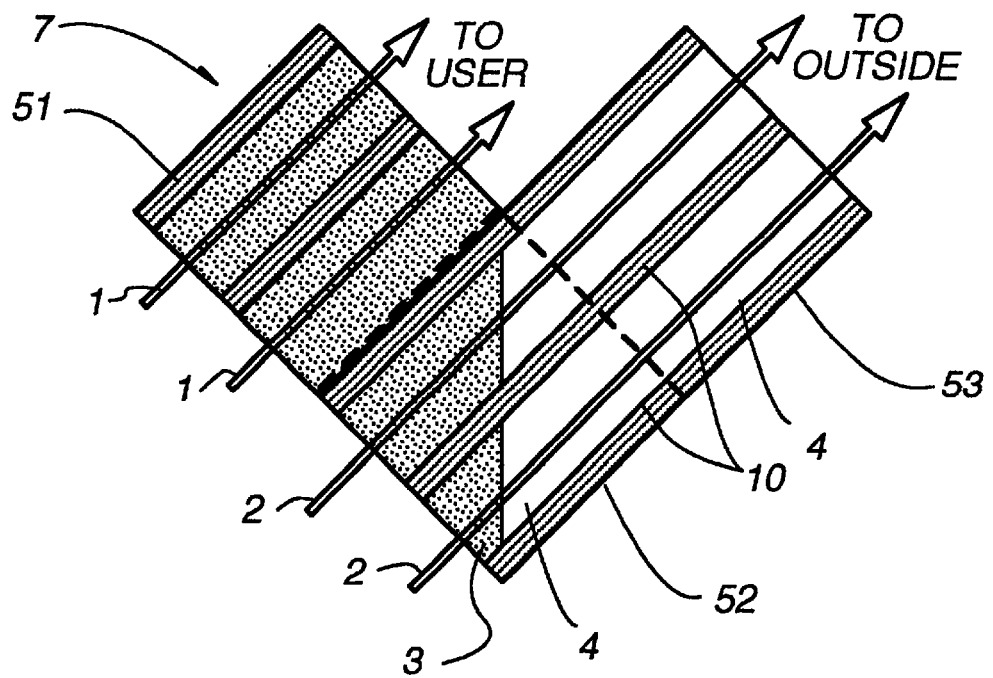
FIG. 2A is a schematic representation of the flow path of the present invention for the first side of a version of a plate.
Figure 2B:
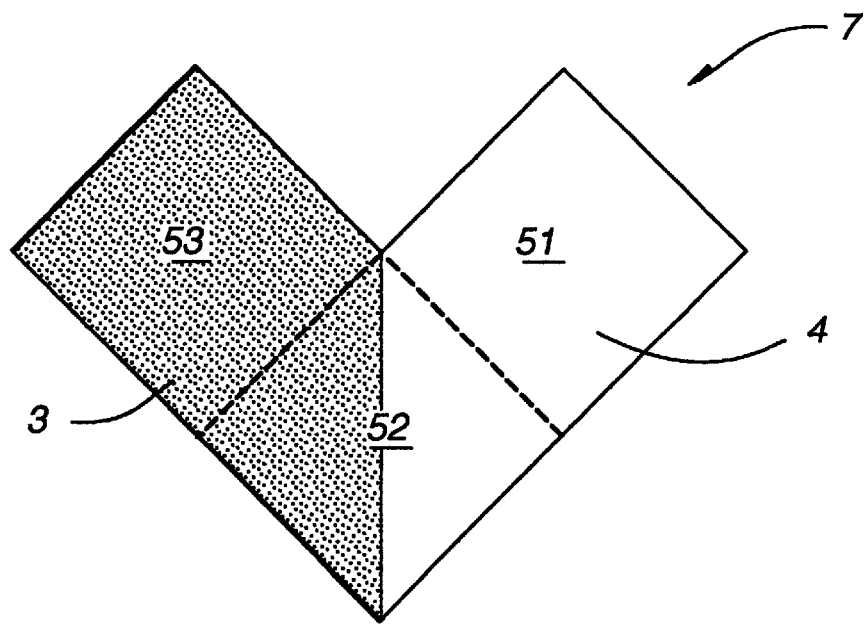
FIG. 2B is the reverse side of the plate shown in 2A.

FIG. 1A illustrates one configuration of the top surface of the plate (7) as used in the apparatus. The plate (7) is formed by wick material with a portion having a low permeability material surface, such as plastic. The low permeability of the plastic layer prevents moisture from crossing the plate (7) from one side to the other. The plastic coating, if a separate layer, is thin and is placed onto the wick layer by painting, by lamination or other suitable means.

As illustrated in FIG. 1A, the top surface of plate (7) has a portion where the wick material is exposed (4), and a portion with the plastic layer is exposed (3). Additionally, the FIG. 1A shows working air channels (2), product air channels (1) and channel guides (10). The wet zone (4) is exposed wick material. The dry zone (3) is the wick material with the impermeable surface. FIGS. 1A, 1B, 2A, and 2B are segmented into quadrants 51, 52, 53 and 54.

Figure 3A:
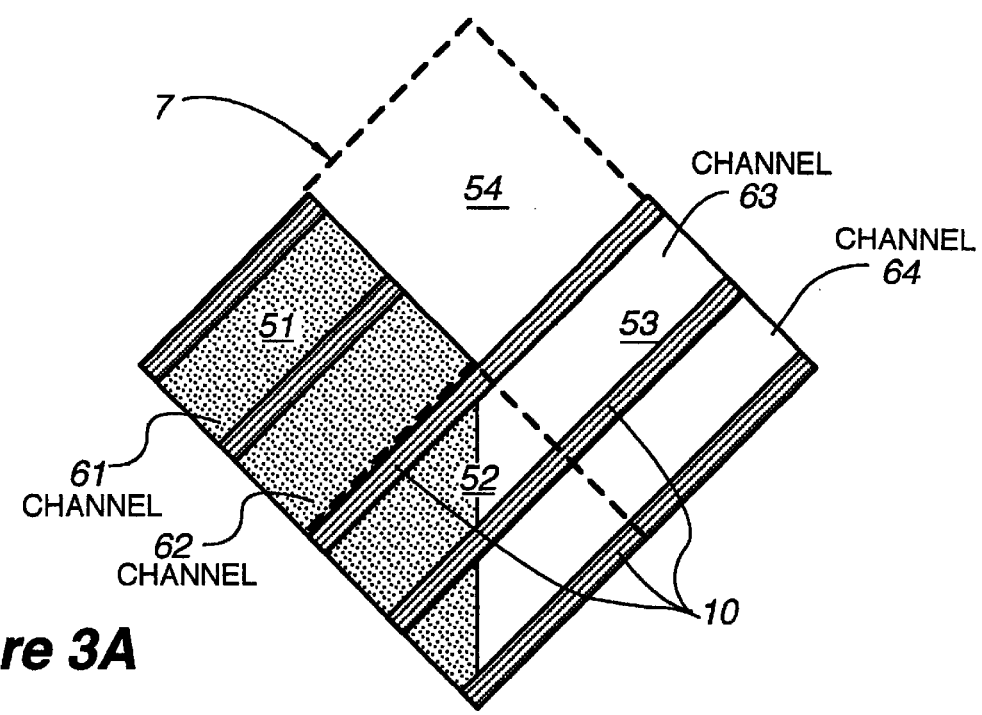
FIG. 3A is a schematic representation of the flow channels on the first side of a plate as depicted in FIG. 2A.

The configuration as shown is a square. It may be of any suitable structural shape. For ease of explanation FIG. 3A shows the overall square dimensions divided in four quadrants No. 51,52,53, & 54. In this FIG. 3A quadrants (51) is covered by plastic. Quadrant 52 is covered by plastic over one-half of its area. While 53 is of the wick material and is not covered by plastic. Quadrant 54 in this particular embodiment is omitted from the plate (7).

There are channel guides (10), see FIG. 1A, located along the top surface of plate (7). The channel guides (10) are in parallel and spaced the desired spacing to accomplish the task of confining and directing the flow of fluids along the surface of plate (7). The flow space is defined by the adjacent channel guides (10) and the surfaces of adjacent plates (7). Where the channel is bounded by plastic layers on the opposing surfaces of adjacent plates, the channel is designated a dry channel, or product channel (1) in as much as the liquid in the wick layer is prevented from evaporating into the channel fluid. While the channel is bounded by the wick layer of adjacent plates (7) the channel is designated as a wet channel or working channel (4) in as much as the liquid in the fiber interacts and evaporates with the fluid or air flowing in the working channel.

To complete the channel there needs to be a top surface spanning the channel guides. This is provided by the bottom surface of second or next plate in an assembly or stack. As can be seen by looking at FIG. 2A, the dry zone (3) is in the comparable location to the dry zone on the bottom surface of the first plate (7). See FIG. 1B and FIG. 2A. Thus the dry zone of the surface of adjoining plates oppose each other across the space defined by those two plates. Thus the dry channel, or product channel (1), is created and bounded by plastic coated plate sections.

Figure 3B:
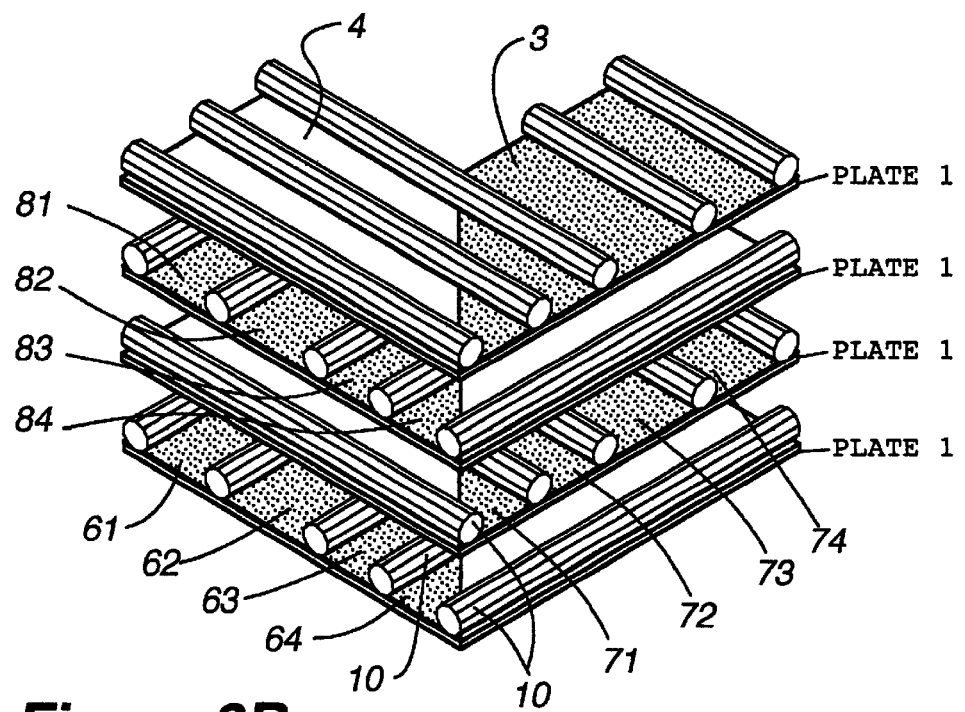
FIG. 3B is a schematic representation of a stack of plates.

In the assembly of plates (7) as shown in FIG. 3B, all odd number plates will be identical. All even number plates will be identical. If we look at a sample plate as FIG. 2A, divided into quadrants as shown in, and farther remove the fourth quadrant as depicted we will have plate 1 of the assembly. The channel guides (10) are oriented for this layer in the designated position. The next plate in the assembly, plate 2, also is a square with the fourth quadrant missing but it has its plastic sheet covering the mirror image of that portion covered in the first plate shown in FIG. 2A. When the second plate is stacked onto the first plate, resting on the channel guides, there will be space defining channels.

For purposes of explaining the working of the assembly, we will designate the channels between the first and second plate as product dry channel 61, 62, 63 and 64. 61 and 62 are product dry channels. 63 and 64 are the working air wet channels. In quadrant No. 52 the working air passes over some surface that is plastic coated and some that is not. For channel 63 the majority of the path in the quadrant is over plastic and thus primarily a dry channel. For channel 64 it is primarily over the wick area and thus a wet channel though it has some plastic or dry channel.

In the assembly as shown in FIG. 3B the plastic coated section of the plate top of the second plate is the mirror image of that portion of the first plate. The channel guides are oriented 90 degrees from the orientation of the channel guides on the first plate. With the addition of a third plate channels 71, 72, 73 and 74 are formed and defined by the channel guides on the second plate, the top surface of the second plate and the bottom surface of the third plate.

The flow of the channels in 71, 72, 73 and 74 are cross flow oriented to the flow in channels 61, 62, 63 and 64. The channel guides-for the third plate are oriented in parallel to the channel guides on the first plate. With the addition of a fourth plate on top of the third plate channels 81, 82, 83 and 84 are formed and defined by the channel guides on the third plate, the top surface of the third plate and the bottom surface of the fourth plate.

Channels 81 through 84 are flowing parallel to channels 61 through 64 while at the same time being in crossflow orientation to channels 71 through 74. Using these channel numbers and the orientation as described in FIG. 3A for the quadrants of the plates the interaction and cooling due to the evaporation and particular orientation set forth herein will be discussed and explained.

For channels 61 and 62 and channels 81 and 82 their flow is entirely in dry channels of the product cooling quadrant 51. Adjacent to them in the space above plate 2 are the channels 71 and 72, which are working channels (2) or wet channels. In quadrant 52 over those portions of channels 71 and 72 that are in the wet area there is an area called the pre-cooling section. Through evaporation of the fluid in the wick like material that are on the floor and ceiling of channels 71 and 72, when the flow is in the pre-cooling area, or later in the product cooling of quadrant 51, the temperature of channel surfaces and the fluids will be lowered.

The fluids in channels 71 and 72 will have temperatures below that of the ambient or starting temperature going into channels 71 and 72 caused by the evaporation in the wet portion of channels 63, 64, 83 and 84 in quadrant 52. In turn, channels 63, 64, 83, and 84 are precooled by the evaporation in channels 71 and 72 in quadrant 52. As the flow continues down channels 71 and 72 additional evaporation will occur in quadrant 51 further lowering the temperature of the flow and of the adjacent walls of the channel. Because the wick layer on the adjacent plates are the upper and lower walls of channels 71 and 72 and because this wick layer is moist from the evaporative liquid there is good heat transfer through the plates. The product fluid in channels 61, 62, 81 ands 82 are then cooled by indirect evaporation.

The only structure that separates the working channels, 71 and 72, from the adjacent spaces and their temperatures, is the plastic layer on the top surface of the third plate and bottom surface of the second plate in quadrant 51. Because this plastic layer is very thin the heat transfer between channels 71 and 72 and the product channels 81 and 82 and 61 and 62 is very high, maintaining a small temperature difference across the plates. Thus the temperature in channels 61 and 62 in the first space layer and channels 81 and 82 in the third space layer are lowered due to the low-temperature in channels 71 and 72 brought about by evaporation and pre-cooling. Thus the product flow of fluid entering channels 61 and 62 and channels 81 and 82 has its temperature lowered during its passage through the channels. Product exits into what had been the fourth quadrant and are thus and then directed for the desired use of the product fluid or air.

The product fluid or air in the second space contained in channels 73 and 74 are likewise cooled across the plastic barrier by the working air channels of 63 and 64 and 83 and 84 in the adjacent channel layer's in the stack as illustrated.

Within quadrant 52, because there is pre-cooling of working fluid in channels 63, 64, 71, 72, 83 and 84 there will be additional cooling in the spaces between the plates 1,2,3 and 4. In channel 71 the first quarter of the flow is over plastic and thus is a dry channel. There is no evaporation occurring in this section. For the remainder of channels 71 in quadrant 52 there is evaporation and thus cooling of the flow and of the adjacent walls. This cooling by channel 71 through heat transfer across the second and third plates that border channel 71 in channels 63 and 64 above the first plates space and in channels 83 and 84 above the third plates space precools the air. This cooling due to channel 71 occurs in the early part of the flow in 63, 64, 83 and 84. Thus the flow in these four channels is precooled, without adding humidity, before it commences to be cooled by evaporation within its own channel.

Similar pre-cooling occurs in channel 71 however channel 72 has more cooling because there is more plastic covering channel 72 in quadrant 52. The flow in channel 72 is precooled by the flow occurring in 63, 64, 83 and 84. Because there is more plastic in channel 72 there is more pre-cooling from these adjacent channels.

The pre-cooling occurring in quadrant 52 lowers the temperatures of all the working air before entering the product cooling section in quadrant 51 and 53.

Figure 4A:
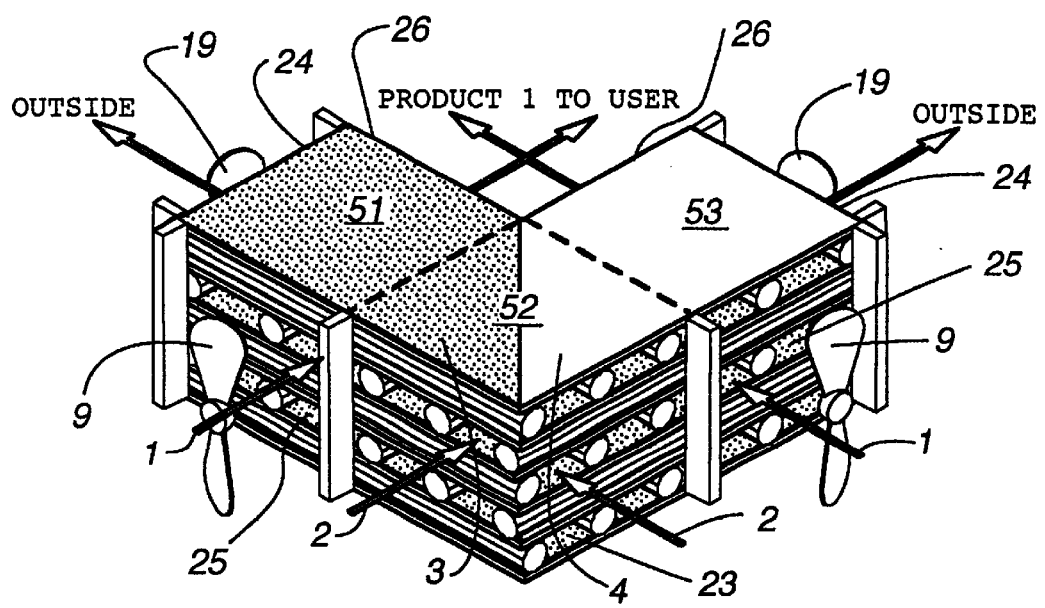
FIG. 4A is a schematic representation of a stack of square shaped plates.
Figure 4B:
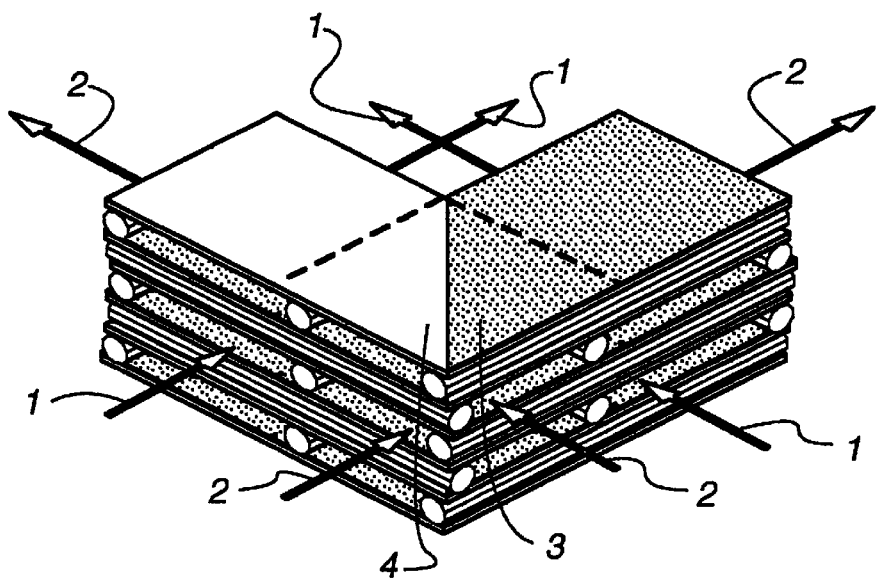
FIG. 4B is a schematic representation of a stack of diamond shaped plates.

The embodiments as shown in FIGS. 1, 2, 3 and 4A are of a square configuration of plates (7). There are alternatives, among them a diamond shape such as shown in FIG. 4B. The selection of a square shape or diamond shape would be determined by the design decisions as further explained.

A diamond shape has the advantages of having the working fluid flowing relative to the product fluid at an angle other that ninety degrees. Rather than being oriented at right angles to the adjoining fluid flow it is more of an obtuse angle. The flow is more counter flow than cross flow. As the angle of orientation moves beyond 90 degrees the area of interaction of the product flow and the working fluid in the adjoining layer increases. Thus the working fluid while becoming cooler through evaporation has more time to interact with the product fluid. The product fluid is given more time to cool by heat transfer.

At the end of the working air channel the working air temperature is lower due to its longer exposure to the evaporative surface in the wet zone. In the diamond shape, there is a greater proportion of the area of the plate (7) on the perimeter, in as much as the square shape has more interior area. Thus the diamond shape gives proportionately more area on the perimeter, area that is cooler due to the ends of the working air channels are at the perimeter. In any heat transfer surface, the amount of area and the differential temperatures in these areas (all other things being equal) will affect the amount of heat transfer that will occur. In the diamond shape the coolest part of the working fluid is at the perimeter, and inasmuch as the diamond gives more area at the perimeter, the diamond gives more proportion of its area to heat transfer where the temperature of the working flow is the coolest. Thus the diamond shape gets greater heat transfer because of the distribution of the area in the diamond puts more of the coolest area at the perimeter, where the product fluid has the largest amount of area to interact with it. Thus there will be more area for heat exchange for the two flows and thus to have the sensible heat transfer across the plastic surface (3).

An additional feature of the diamond shape that accentuates the heat transfer more than what occurs in the square shape, is the counterflow. Flows being more counter flow than cross flow, the gradient of temperature as it decreases along the working air (2) channel, puts the lowest part of the temperature in the working channel, across the heat transfer surface from the product air (1). Thus the heat differential is greatest and the heat transfer will be the greatest. Though this same effect will occur in square shapes, the square having more interior area does not get the same quantity of heat transfer.

Another advantage of a diamond shape when used in an upright orientation (See FIGS. 8A and 8B) is the advantage of lower vertical distance for plates when the diamond is oriented with its long axis horizontal to the ground. If the plates (7) in their assembled state are vertical or at an angle of orientation or slope the lower edge may be immersed in a reservoir of evaporating fluid. The wicking function of the wick layer transports the evaporating fluid from the reservoir upward to the upper reaches of the wick layer. If the plates shape is a diamond shape this vertical height that must be wicked in order to wet the upper reaches of the wick layer will be lower. The wicking can occur over longer distances, more efficiently, the more horizontal the plates are.

The advantages of a square shaped plate is in its compactness. As discussed previously, a square, over a diamond, creates the smallest footprint. More of the area is in the interior. The square shape then is best where compactness is essential.

In addition to the shape, the omission of the $4^{th}$ quadrant (54) as shown in FIG. 3A has advantages. By removing the $4^{th}$ quadrant a reduced pressure drop for the fluid flow for the product air (1) is achieved. The product air is cooled by the adjacent working air (2). The $4^{th}$ quadrant would merely place adjacent layers of product air (presumable at the same temperature) next to each other. No gain in the product temperature is had. By omitting the $4^{th}$ quadrant less energy is expended in the passage of the product through these areas of the product channels, as the restricted channel is shorter.

Figure 5A:
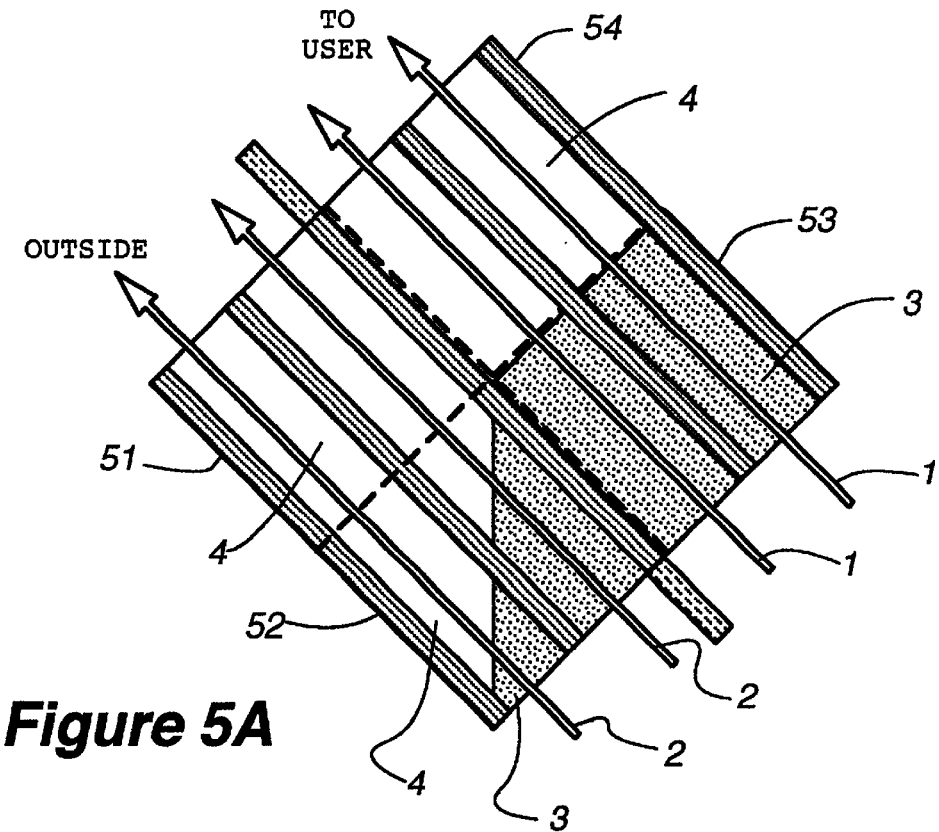
FIG. 5A is a schematic of a plate such as in FIG. 1A with the $4^{th}$ quadrant used as a direct evaporative cooling area.
Figure 5B:
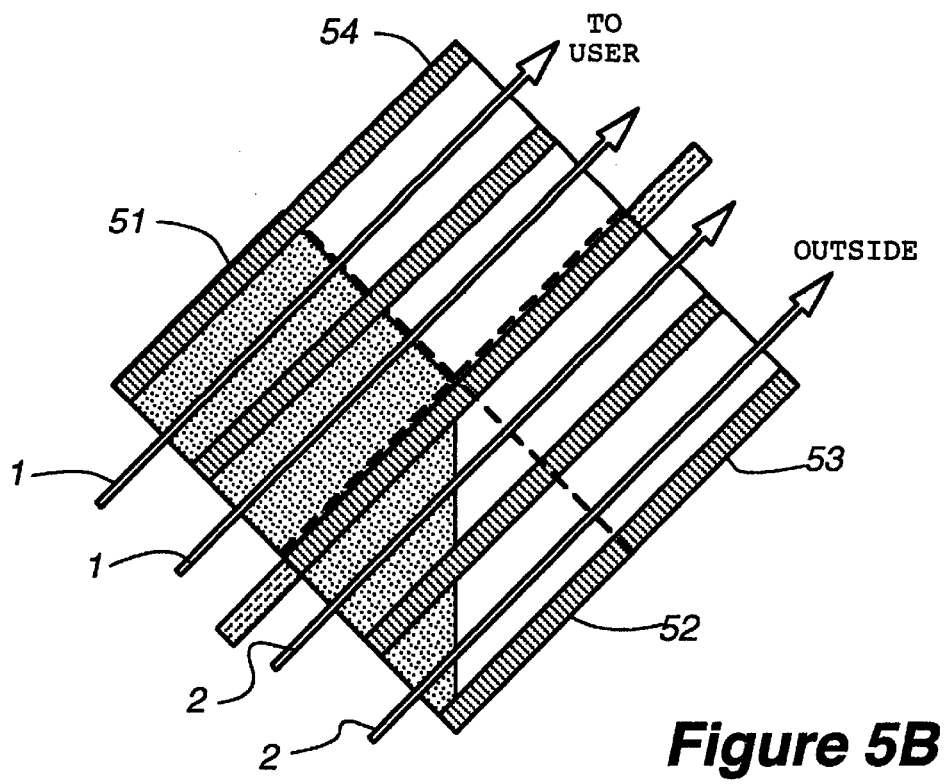
FIG. 5B is a view of the reverse side of plate in 5A.

An alternative design decisions may dictate that quadrant 4 (54) not be omitted but rather kept as an evaporative area for the product flow, see FIG. 5A. This added area of direct evaporative cooling for the product air (1) that is previously came through the product air channels (3) will give these advantages: there will be added cooling to the product air and some degree of humidity will be added to the product air. The addition of direct evaporation cooling may be necessary in some applications to lower the temperature.

In some environments the main feature or function of the within design may be to add humidity. This can be accomplished by the apparatus as shown in FIG. 3A by making use of the exhaust product which has increased humidity over typical evaporative humidifiers. Additionally the use of direct evaporative channels after the product channel can be used to add humidity to the product air such as in FIG. 5A.

The exact mix of humidity to add to the product air can be altered by design decisions of the amount of direct evaporative cooling added to the product channel or by mixing the exhaust working air in some proportion with the dry cooler product air by use of baffles or other means.

In addition the ability to add humidity and at the same time control the temperature of the end product mixture enables the user to adjust humidity and temperature independently to accomplish the target conditions. This apparatus allows the user to adjust the humidity without having to also adjust the temperature by an outside heat source in conditions where higher humidity is desired but not lower temperature.

The apparatus by an additional feature can manipulate the latent heat capacity of the working fluid to accomplish a more efficient cooler. By adding heat to the working air (2), additional latent heat capacity of the working air and additional evaporation capacity results to the system. If the working air has humidity above 0.0011 to 0.0014 pounds of water per pound of air (wherein the variation is dependent upon the elevation above sea level) the adding of heat to the working air will aid in the heat transfer mechanism. Above this level of humidity the addition of sensible heat causes a much greater increase in the latent heat capacity of air. This is a benefit to the cooling process. This added latent heat capability gives the working air greater capacity, which in turn gives the system greater capacity to cool down the temperature through the evaporative process.

The flow of fluids, working air (2) or product air (1), can be aided by common mass transfer devices such as fans pumps or other devices common in industry. To aid in the efficiency of the system and its design the indirect evaporative cooler is enhanced if the working air (2) has a pressure drop at its exhaust which induces the flow of the working air through the working air channels (17). By producing a negative pressure differential across the working air channel the evaporative process in the working air channel will be enhanced as lower pressure aids evaporation.

Figure 6:
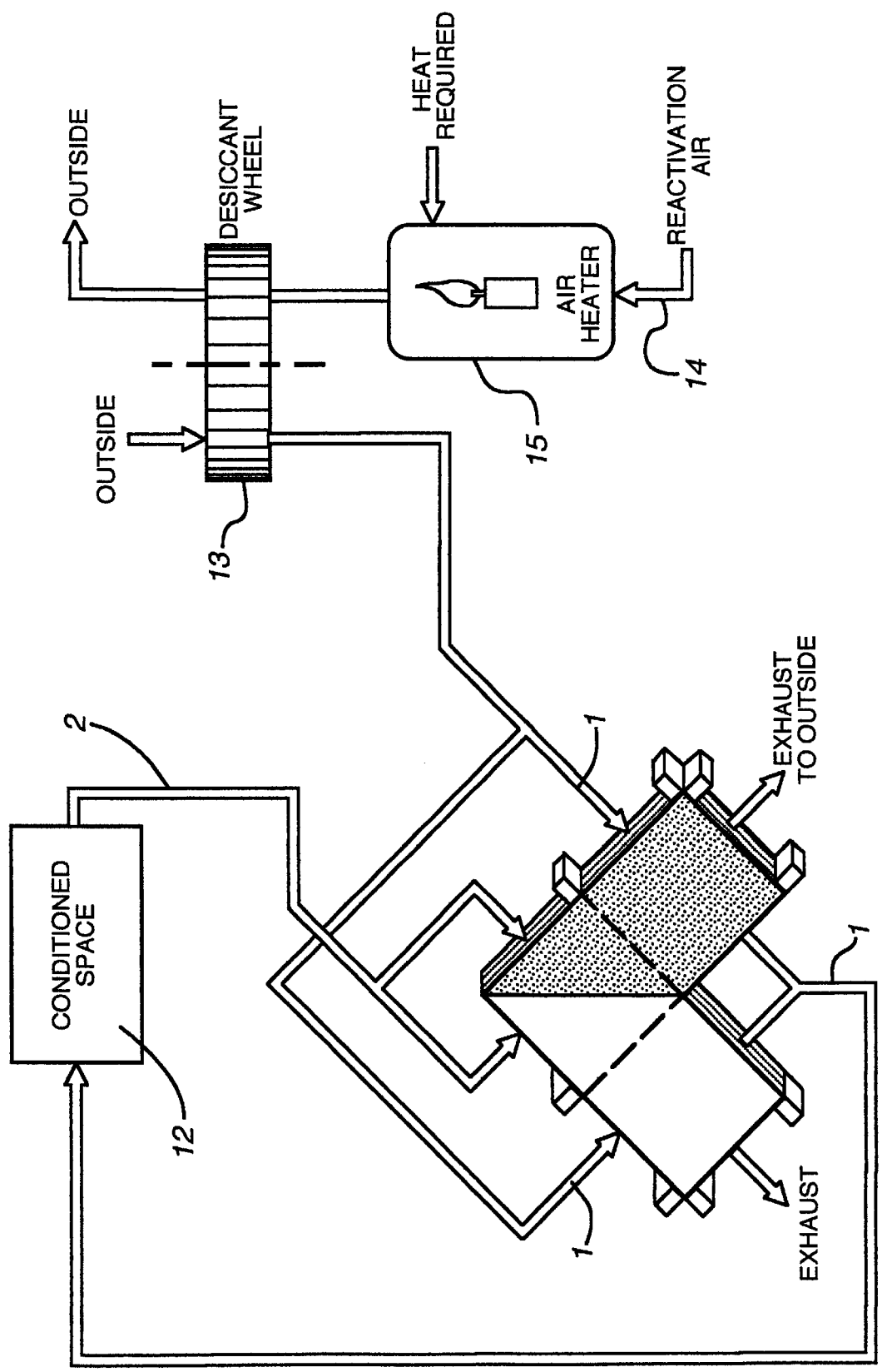
FIG. 6 is a schematic of a fresh make-up-air drying and cooling system for a conditioned space.
Figure 7:
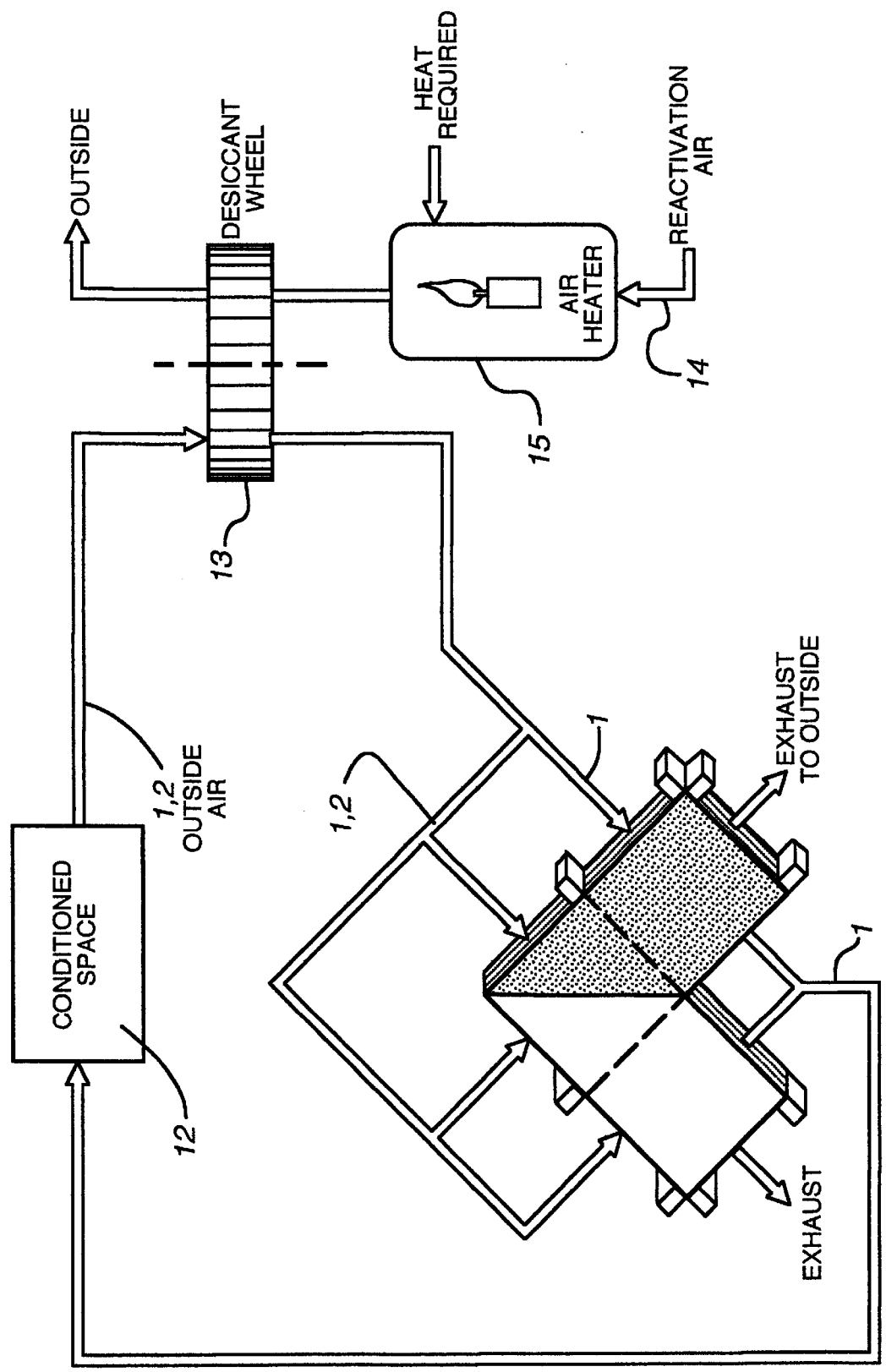
FIG. 7 is a schematic of a recirculation air-drying and cooling system for a conditioned space.

Desiccants can also be used in the system as shown in FIGS. 6 and 7. The benefits to the indirect evaporative cooler are in enhanced efficiencies of the evaporative process, control of the humidity of the working or product air, and the use of the by product of the heat generated during dehumidification to increase the latent heat capacity of the working air in the evaporative process In viewing FIGS. 6 and 7 the desiccants wheel is illustrated (13). In FIG. 6 outside air is first drawn through and dehumidified by the desiccant wheel. The dehumidification raises the temperature of the dehumidified air due to the heat occurring by extracting the water from the outside air. In FIG. 6 the dehumidified air is used as the product air, in order to control the humidity and yield cool dry air as product (1). In FIG. 6 the working air is recirculated air from the condition space (12) which is already dry and thus a larger capacity for the evaporative process for the cooling.

As shown in FIG. 7 the air from the conditioned space is recirculated. In this embodiment the recirculated air is used for both the product air and the working air. After recycling, the working air is exhausted and thus there is a net loss of air for circulation. To make up for this loss, outside air is used to supplement the system air. Before use the outside air may have to be dehumidified. After going through the desiccant wheel and becoming dehumidified this combination air is fed into both the product (16) and working (17) channels. The exhaust of the working channel (17) is exhausted to the outside and the product channels (16) in sent to the conditioned space (12).

The dissipate of the desiccant system usually requires the use of the heat exchanger system to redirect or dissipate the heat caused by the dehumidification step. However in the subject design the heat generated by the dehumidifier is used to enhance the evaporative process by going to the working air stream. Thus rather than having to remove heat from this dehumidified air the heat gives added efficiency and capacity to the system.

Figure 11:
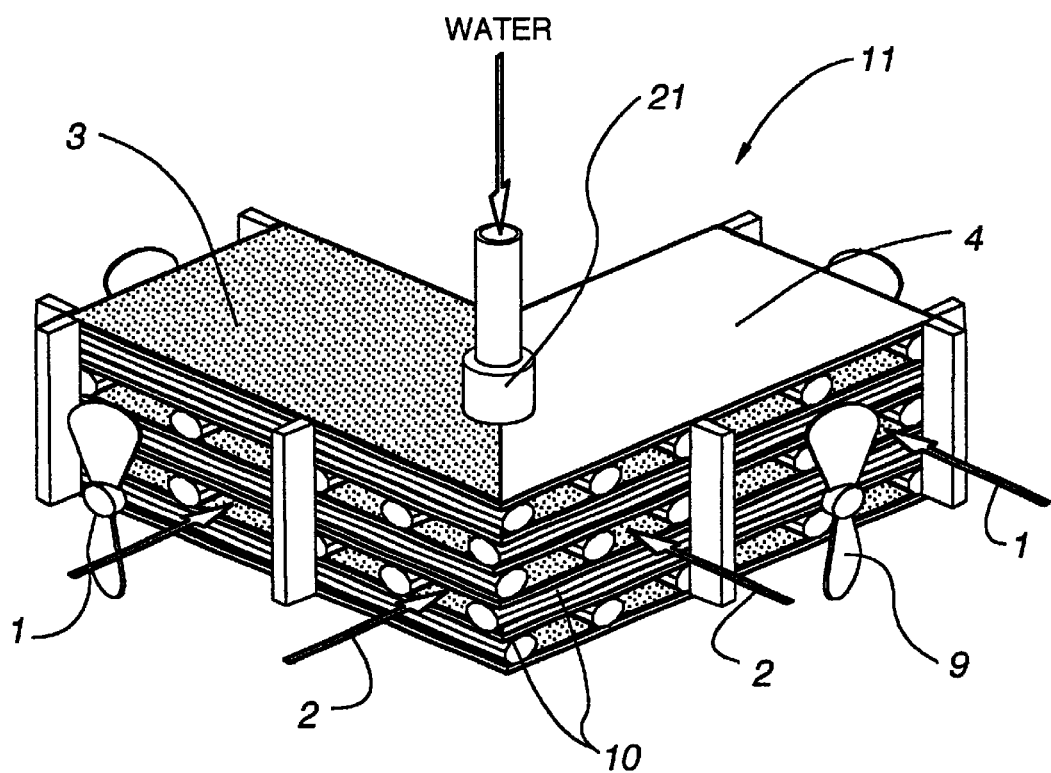
FIG. 11 is a schematic of an apparatus, wherein a plethora of plates with a feeder wick water distribution system.

The system of wetting the wick material in the plates (7) by evaporating fluid can be accomplished by pure wicking from a low point of the wick material immersed in a reservoir or by distributing the evaporating fluid by means of feeder wick that is positioned and interface with the wick material on the plates. FIG. 11 illustrates a feeder wick where evaporating fluids are distributed by way of hoses or tubes to the desired location. From the tube the evaporating fluid enters the feeder wick which fits in a hole in the plates. The outer edge of the wick material on the feeder wick interfaces with the inside surface of the holes in the plates and the wicking layer on the plates. The evaporating fluid fed by way of the tube to the feeder wick and then exits the tube through porous openings or holes into the feeder wick material. This feeder system prevents the pooling of liquid which can inhibit the evaporation process due to surface tension of fluids. Additionally the wicking methods do not require as much energy to transport the fluid. Thus energy cost will be saved.

Figure 8A:
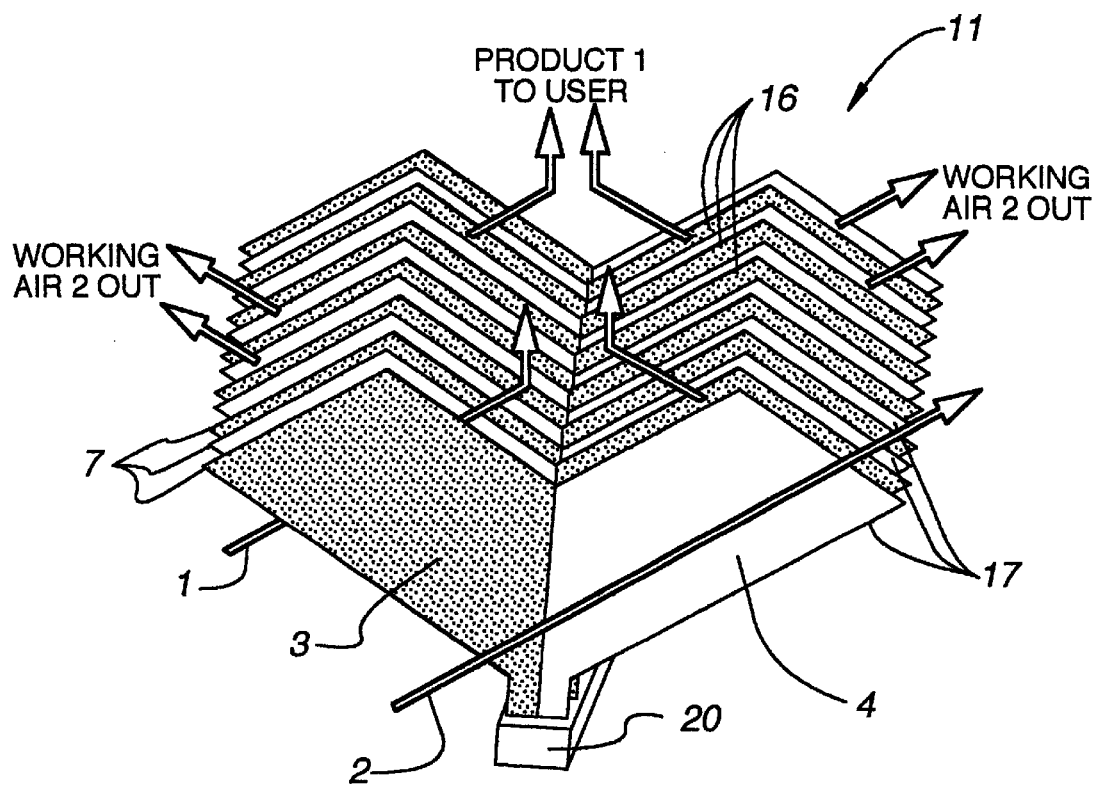
FIG. 8A is a schematic of an apparatus, wherein a plethora of plates set in a reservoir of water.
Figure 8B:
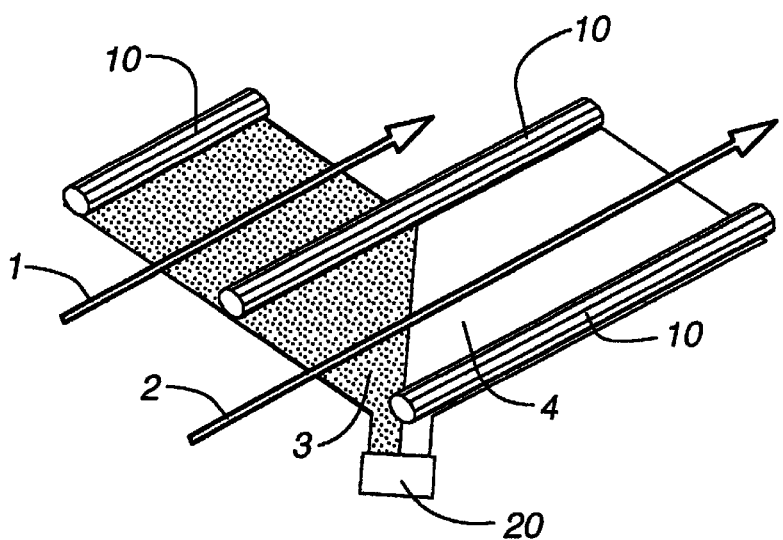
FIG. 8B is an individual plate from FIG. 8A.
Figure 9:
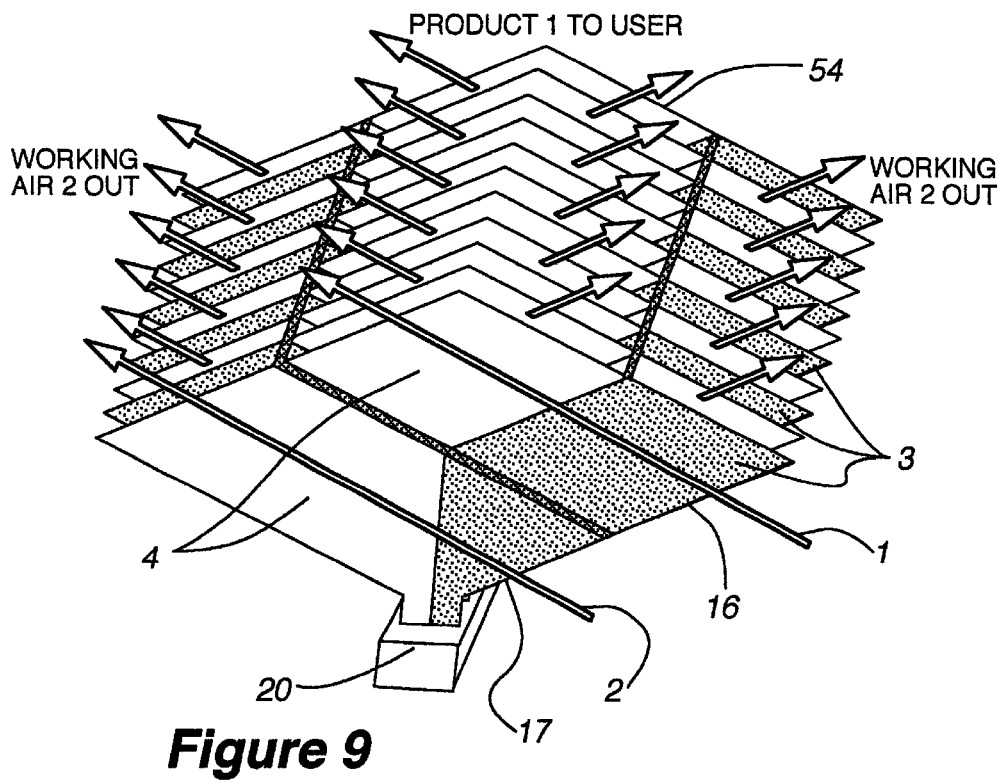
FIG. 9 is a schematic of an apparatus, wherein a plethora of plates set in a reservoir of water with an apparatus, wherein an evaporative cooling section is included in the apparatus.

FIGS. 8A, 8B, and 9 illustrate the reservoir system where the plates are vertical or in a sloped position with their lower edge immersed in the reservoir holding the evaporating fluids. As the evaporation takes fluids from the wick material the wicking from the reservoir replenishes that liquid for subsequent evaporation. In order to aid in the wicking the plates cannot be overly tall.

This may be addressed by the use of a diamond shape as previously discussed rather than a square shape. Alternately the plates may be elevated at an angle rather than vertical. This minimizes the amount of gravity that must be overcome to wet the uppermost area of the wick material.

Figure 10:
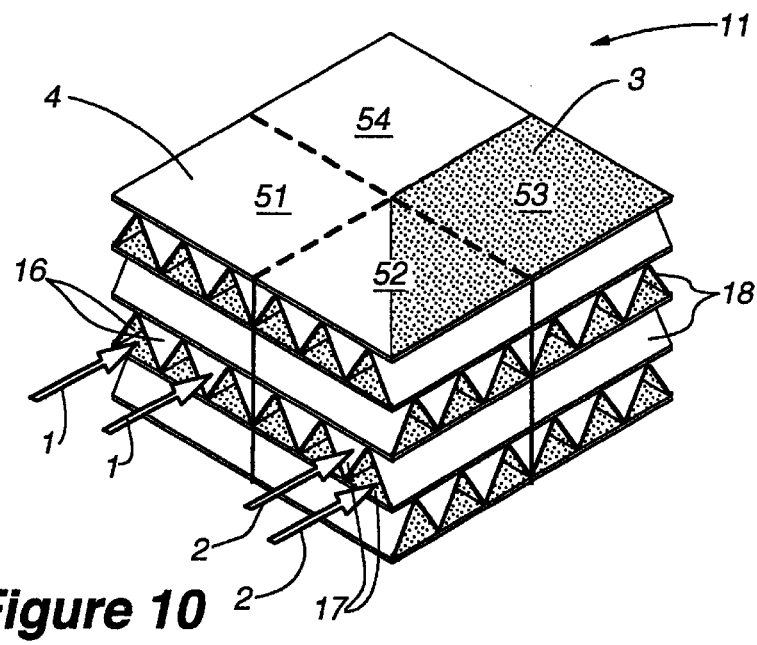
FIG. 10 is a schematic of an apparatus, wherein a plethora of plates using corrugated sheets to separate them and wherein an evaporative cooling section is included in the apparatus.

FIG. 10 illustrates an assembly where the individual plates (without the separate channel guides (10) are separated by corrugated inserts. These inserts maintain the separation and also act as the channel guides for the flow of product air and workign air. The inserts are preferred to be of an impermeable material such as plastic or resin impregnated cellulose or paper so that in the wet channel the purportrating liquid won't be in the inserts.

We claim the following:

1. A method to provide indirect evaporative cooling while controlling humidity of the cooled product air by having three plates in parallel:
   a) forming a first space and second space between adjacent plates with the middle plate being a common plate to both spaces;
   b) wetting opposing surfaces of the adjacent plates;
   c) keeping some surface areas of opposing surfaces dry;
   d) passing air in the first space in two types of channels, working channels and product channels;
   e) passing air in the second space in working channels and product channels in cross flow to the flow in the first space channels;
   f) controlling the humidity in the product channels by the amount of wet surfaces the product air is exposed to in the product channels; and
   g) cooling the air in the product channels by the dry surfaces being cooled by heat transfer across the common plate in this area and the evaporation cooling on the opposite surface of the common plate in the adjoining space that is occurring in a wet area of a working channel.

2. The method of claim 1 wherein pre-cooling occurs in each space in a section where working channels are on both sides of the common plate having dry areas and wet areas having equal area; the pre-cooling section having the dry area occurring first in the working channel having the transitive to a wet area occurring on a diagonal to the direction of flow in the working channel having the orientation of the working channel dry area in a first spacing being opposite from the dry area of the working channel of the second space such that the common plate dry area in the first space is opposite the wet area of the common plate in the second space pre-cooling of the working air in the second space by heat transfer from the first space and pre-cooling of the working air in the first space by heat transfer from the second space.

3. A method according to claim 1 wherein after the product fluid, for example air, has passed through the product cooling section it passes over a wet surface.

4. A method according to claim 1 wherein the product fluid includes its own fluid moving device.

5. A method according to claim 1 wherein the working air is heated before entering the pre-cooling section.

6. A method according to claim 1 wherein the humid working air exhaust becomes the product and is directed to the user for humidification of desired area.

7. A method according to claim 1 wherein outside ventilation air is used as the product fluid for the user in, for example, a conditioned space and is passed through a solid or liquid desiccant dehumidifier, and this product air is then cooled by passing its two streams over the dry side of two product cooling sections, and then is directed to the user; and simultaneously at least one of either the exhaust air from conditioned space and/or outside air that has passed through a solid or liquid desiccant humidifier is used as the working air, that then passes by two streams through the pre-cooling section, is then directed straight across the product cooling section and then is exhausted out.

8. A method according to claim 1 wherein all or a portion of the inside recirculation air is used as a product fluid for the user in, for example, a conditioned space and is passed through a solid or liquid desiccant dehumidifier; this product air is cooled by passing its two streams over the dry side of two product cooling sections and then is directed to the user;

simultaneously outside air and in some case all or a portion of the same recirculation air from conditioned space, after its passing through the desiccant dehumidifier, is used as the working air, that then passes by two streams through the pre-cooling section, is directed straight across the product cooling section and then is exhausted out.

9. Apparatus for indirect evaporative cooling comprising:
   at least two plates in parallel, each plate having two surfaces, and wherein
   a) at least part of one of the surfaces is impermeable to the fluid used for evaporation,
   b) the plates are made of a material that has a wick like capability that transports the liquid used for evaporation to the areas of the plates where evaporation is to occur and once there allows the liquid to evaporate,
   c) the impermeable areas are thin, so as to allow for heat transfer,
   d) the opposing surfaces of adjoining plates are of like surface permeability,
   e) the evaporation occurs in the areas without the impermeable surface and cools the surface and the working air,
   f) the cooler temperatures due to the evaporation is in heat transfer contact with the impermeable surface and the product air that is in contact with this surface, and
   g) the apparatus has channel guides, working air channels, and product air channels to direct the flow in a desired path.

10. The apparatus of claim 9 wherein the plate shape is of a diamond.

11. The apparatus of claim 9 wherein the plate shape is square.

12. The apparatus of claim 9 wherein the impermeable surface is created by a plastic coating on the wick material.

13. The apparatus of claim 9 where the plates of the stack have impermeable surfaces on the product channels to inhibit any direct evaporation occurring.

14. The apparatus of claim 9 where the working channels have some areas of impermeable surface.

15. The apparatus of claim 9 where the plate shape has one part removed.

16. The apparatus of claim 9 where the plate shape uses the fourth quadrant to have direct evaporative cooling of the product air after it has been cooled by the indirect cooling.

17. The apparatus of claim 9 where the plates are fed the liquid for evaporation by feeder wicks.

18. The apparatus of claim 9 where the plates are sloped with the lower edge fed liquid for evaporation by a reservoir.

19. The apparatus of claim 9 where the working air is heated before it is used in the working air channels.

20. The apparatus of claim 9 where the working air is dehumidified before it is used in the working air channels.

21. The apparatus of claim 9 where flow of working air and product air between adjoining channels separated by a plate are in cross flow.

22. The apparatus of claim 9 where flow of working air and product air between adjoining channels separated by a plate are more counterflow.

23. The apparatus of claim 9 where the working air is taken from the exhaust after the product air was used.

24. The apparatus of claim 9 where some working air exhaust is added to the product air to accomplish the desired temperature and humidity.

25. The apparatus of claim 9 wherein:
   a) one of the quadrants with only working air channels has one half of each quadrant surface covered with plastic, such that the working air enters one channel;
   b) the channel is in the non evaporative portion of the channel and gets pre-cooled by adjacent layers;
   c) the working air channels also in the quadrant have evaporative cooling in area of their channels; and
   d) the channels interface with the first channel plastic surface.

26. A method to provide indirect evaporative cooling and to control the humidity by having at least two plates with two surfaces wherein there is:
   a) wetting on opposite surfaces of the two plates;
   b) keeping some surfaces areas of the opposing surfaces dry;
   c) passing air between the plates;
   d) controlling the humidity by varying the amount of wet surfaces to which the air is exposed; and
   e) cooling the air over the dry areas by heat transfer by having evaporation occurring on the opposite side of each plate in the area.

* * * * *